United States Patent
Sill et al.

(10) Patent No.: US 7,848,758 B1
(45) Date of Patent: Dec. 7, 2010

(54) DYNAMIC ALLOCATION OF CARRIER FREQUENCIES IN WIRELESS WIDE AREA NETWORKS

(75) Inventors: Timothy W. Sill, Platte City, MO (US); Dae-Sik Oh, Overland Park, KS (US); Samuel M. Woleben, Olathe, KS (US); Bryan T. Barbee, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 413 days.

(21) Appl. No.: 11/236,351

(22) Filed: Sep. 27, 2005

(51) Int. Cl.
*H04W 72/00* (2009.01)
(52) U.S. Cl. .................. 455/452.1; 455/453
(58) Field of Classification Search .............. 455/422.1, 455/450, 452.1, 453
See application file for complete search history.

(56) References Cited

U.S. PATENT DOCUMENTS

| | | |
|---|---|---|
| 5,197,093 A | 3/1993 | Knuth et al. |
| 5,612,948 A | 3/1997 | Fette et al. |
| 5,617,059 A | 4/1997 | Eggleston |
| 5,809,398 A | 9/1998 | Moberg et al. |
| 5,898,382 A | 4/1999 | Treatch |
| 5,987,304 A | 11/1999 | Latt |
| 6,119,005 A | 9/2000 | Smolik |
| 6,132,306 A | 10/2000 | Trompower |
| 6,289,724 B1 | 9/2001 | Varma et al. |
| 6,360,098 B1 | 3/2002 | Ganesh et al. |
| 6,404,775 B1 | 6/2002 | Leslie et al. |
| 6,463,298 B1 | 10/2002 | Sorenson et al. |
| 6,477,354 B1 | 11/2002 | Roberts et al. |
| 6,487,426 B1 | 11/2002 | Haber |
| 6,542,741 B2 | 4/2003 | Wallstedt et al. |
| 6,571,284 B1 | 5/2003 | Suonvieri |
| 6,658,269 B1 | 12/2003 | Golemon et al. |
| 6,690,915 B1 | 2/2004 | Ito et al. |
| 6,697,603 B1 | 2/2004 | Lovinggood et al. |
| 6,735,432 B1 | 5/2004 | Jarett et al. |
| 6,754,196 B1 | 6/2004 | Daane et al. |
| 6,993,287 B2 | 1/2006 | O'Neill |
| 7,006,797 B1 | 2/2006 | Sullivan et al. |

(Continued)

FOREIGN PATENT DOCUMENTS

WO  WO 98/53621 A2  11/1998

(Continued)

OTHER PUBLICATIONS

Final Office Action from U.S. Appl. No. 11/449,527 mailed Apr. 14, 2010.

(Continued)

*Primary Examiner*—Temica M Beamer

(57) ABSTRACT

Methods and systems are provided for dynamic allocation of carrier frequencies in wireless wide area networks (WWANs). A first base station among a plurality of base stations in a WWAN determines that a level of load in a wireless coverage area exceeds a load threshold, and responsively (i) obtains a first keycode from a keycode library, wherein the first keycode then becomes unavailable to the other base stations of the plurality of base stations, (ii) identifies a carrier frequency, and (iii) uses the first keycode to activate the identified carrier frequency in the wireless coverage area.

18 Claims, 8 Drawing Sheets

U.S. PATENT DOCUMENTS

| | | | |
|---|---|---|---|
| 7,035,587 B1 | 4/2006 | Yarkosky | |
| 7,046,964 B1 | 5/2006 | Sullivan et al. | |
| 7,190,937 B1 | 3/2007 | Sullivan et al. | |
| 7,299,005 B1 | 11/2007 | Yarkosky | |
| 7,457,584 B2 | 11/2008 | Baker | |
| 7,480,485 B1 | 1/2009 | Oh et al. | |
| 2001/0031621 A1 | 10/2001 | Schmutz | |
| 2001/0036837 A1 | 11/2001 | Uistola | |
| 2002/0044594 A1 | 4/2002 | Bongfeldt | |
| 2002/0045431 A1 | 4/2002 | Bongfeldt | |
| 2002/0183039 A1* | 12/2002 | Padgett et al. | 455/406 |
| 2002/0186749 A1* | 12/2002 | Jones | 375/132 |
| 2003/0083069 A1* | 5/2003 | Vadgama | 455/436 |
| 2003/0114103 A1 | 6/2003 | Dinkel et al. | |
| 2003/0176192 A1* | 9/2003 | Morimoto et al. | 455/453 |
| 2003/0211828 A1 | 11/2003 | Dalgleish et al. | |
| 2004/0106408 A1 | 6/2004 | Beasley et al. | |
| 2004/0152480 A1 | 8/2004 | Willars et al. | |
| 2004/0204097 A1 | 10/2004 | Scheinert et al. | |
| 2004/0235478 A1 | 11/2004 | Lindquist et al. | |
| 2005/0148368 A1 | 7/2005 | Scheinert et al. | |
| 2005/0227619 A1 | 10/2005 | Lee et al. | |
| 2008/0002628 A1 | 1/2008 | Bi et al. | |

FOREIGN PATENT DOCUMENTS

| | | |
|---|---|---|
| WO | WO 98/53621 A3 | 11/1998 |
| WO | WO 2005/011150 A1 | 2/2005 |

OTHER PUBLICATIONS

Unpublished U.S. Appl. No. 11/257,661, entitled "Automatic Self-Provisioning of Base-Transceiver-Station Operational Parameters" filed Oct. 25, 2005 in the name of Timothy W. Sill.

Unpublished U.S. Appl. No. 11/257,648, entitled "Automatic Self-Provisioning of Base-Transceiver-Station Operational Parameters" filed Oct. 25, 2005 in the name of Timothy W. Sill.

Unpublished U.S. Appl. No. 11/449,527, entitled "Automatic Self-Provisioning of Base-Transceiver-Station (BTS) Operational Parameters, with Automatic Neighbor-List Updates of Adjacent BTSs" filed Jun. 8, 2006 in the name of Dae-Sik Oh.

Unpublished U.S. Appl. No 11/484,001, entitled "Automatic Generation of Neighbor Lists in a Wireless Network" filed Jul. 10, 2006 in the name of Roy L. Spitzer.

Final Office Action from U.S. Appl. No. 11/257,661, mailed Nov. 26, 2006.

Non-Final Action from U.S. Appl. No. 11/257,648, mailed Dec. 30, 2008.

Non-Final Office Action from U.S. Appl. No. 11/484,001, mailed Mar. 6, 2009.

Non-final Office Action from U.S. Appl. No. 11/449,527, mailed Oct. 2, 2009.

Office Action from U.S. Appl. No. 11/257,661, mailed May 2, 2008.

Spotwave Wireless, Inc., SpotCell™0 112 (PCS-CDMA), "Product Overview," www.spotwave.com, 2003.

Steve Adams, "The Demands on In-Building Solutions—Using smart antennas and adaptive techniques to improve in-building technique", Wireless Business & Technology Magazine, May 20, 2003.

U.S. Appl. No. 10/753,941, filed Jan. 7, 2004.

U.S. Appl. No. 10/753,942, filed Jan. 7, 2004.

* cited by examiner

| KEYCODE | BASE STATION ID |
|---|---|
| KEYCODE_1 | BS_106 |
| KEYCODE_2 | AVAILABLE |
| KEYCODE_3 | AVAILABLE |
| KEYCODE_4 | BS_108 |
| KEYCODE_5 | AVAILABLE |

KEYCODE TABLE 400

FIG. 4

DYNAMIC ALLOCATION OF CARRIER FREQUENCIES IN WIRELESS WIDE AREA NETWORKS

BACKGROUND

1. Technical Field

The present invention relates to wireless communications and, more particularly, to management of radio frequency resources in wireless communication systems.

2. Description of Related Art

More people than ever are using mobile stations, such as cell phones and personal digital assistants (PDAs), to connect to wireless wide area networks (WWANs), which are also referred to as wireless communication systems, cellular communication systems, wireless networks, radio access networks, wireless access networks, and by other names. Service providers typically operate these WWANs to provide both voice and data services using a wireless communication format such as Code Division Multiple Access (CDMA), or another format.

Service providers typically operate multiple base stations with which the mobile stations may communicate. Each base station typically takes the form of a base transceiver station (BTS) controlled by a base station controller (BSC), which acts as a conduit for signaling and bearer communication between (i) an RF air interface over which the BTS communicates with mobile stations and (ii) a mobile switching center (MSC) and/or a packet data serving node (PDSN). The MSC and/or PDSN provide one or more interfaces between the BSC and one or more signaling and transport networks, enabling mobile stations to communicate with other devices.

Each base station is typically capable of communicating over the air interface with mobile stations on one or more carrier frequencies (carriers). Furthermore, each base station is typically capable of communicating with a finite number of mobile stations on each carrier. Thus, the greater the number of carriers on which a base station is operating at a given time, the greater the number of mobile stations the base station can serve at that time.

Service providers typically purchase base stations capable of operating on a number of carriers, perhaps five as an example. Manufacturers typically design base stations such that, for each carrier on which a service provider wants a base station to operate, the service provider must purchase a keycode, which is essentially a password that unlocks the base station's ability to operate on a carrier. Manufacturers can thus require service providers to separately pay for the base-station hardware and keycodes for each carrier on which the base station will operate.

It is often the case that a base price paid by a service provider for a base station would include at least one or two keycodes, such that the base station could at least be minimally operational. If, at the time of purchase, the service provider wishes to deploy the base station in a high-demand service area that would typically serve a large number of mobile stations, the service provider may choose to purchase additional keycodes so that the base station can operate on a higher number of carriers. If the service provider does not exercise this option initially, but then wishes to redeploy a base station in a high-demand area, or decides that the base station's number of carriers is insufficient, the service provider must pay for additional keycodes from the manufacturer, and configure the base station accordingly.

If a service provider overestimates the number of carriers a base station will need, the service provider may overspend. If the service provider underestimates the number of carriers a base station will need, the service provider must either accept that the base station may not always meet the demands placed on it, or incur the costs of increasing the base station's number of carriers. Also, some base stations occasionally experience expected or unexpected surges in demand, perhaps due to events or emergencies. Furthermore, not only must a service provider attempt to select the optimal number of carriers for each base station, but also the correct carriers for each base station to use, to maximize network performance and quality of user experience.

SUMMARY

Methods and systems are provided for dynamic allocation of carriers in WWANs. Upon determining that a level of load in a particular wireless coverage area exceeds a particular threshold, a base station takes steps to activate one or more additional carriers on which to operate in the wireless coverage area. First, the base station may send a request to a network entity that maintains a library of keycodes, each of which a particular base station may use to activate a carrier. The base station also may also query a database to determine what specific carrier to activate.

Once the keycode has been obtained and the specific carrier has been identified, the base station uses the keycode to activate the carrier and thereby better handle the amount of load that the base station is experiencing. While the base station has the keycode "checked out," that keycode is unavailable to other base stations in the network. Once this load condition has subsided, the base station may then deactivate the previously activated carrier, and notify the library that the keycode is no longer needed, essentially checking the keycode back in to the library, making that particular keycode available to base stations network-wide.

Thus, an exemplary embodiment of the present invention may take the form of a method. In accordance with the method, a first base station among a plurality of base stations in a WWAN determines that a level of load in a wireless coverage area exceeds a load threshold. Responsive to determining that the level of load exceeds the load threshold, the first base station (i) obtains a first keycode from a keycode library, wherein the first keycode then becomes unavailable to the other base stations of the plurality of base stations, (ii) identifies a carrier frequency, and (iii) uses the first keycode to activate the identified carrier frequency in the wireless coverage area.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

FIG. 4 is a simplified block diagram of an exemplary keycode table that may be used in accordance with exemplary embodiments;

DETAILED DESCRIPTION OF EXEMPLARY EMBODIMENTS

1. Overview

Figure 1:
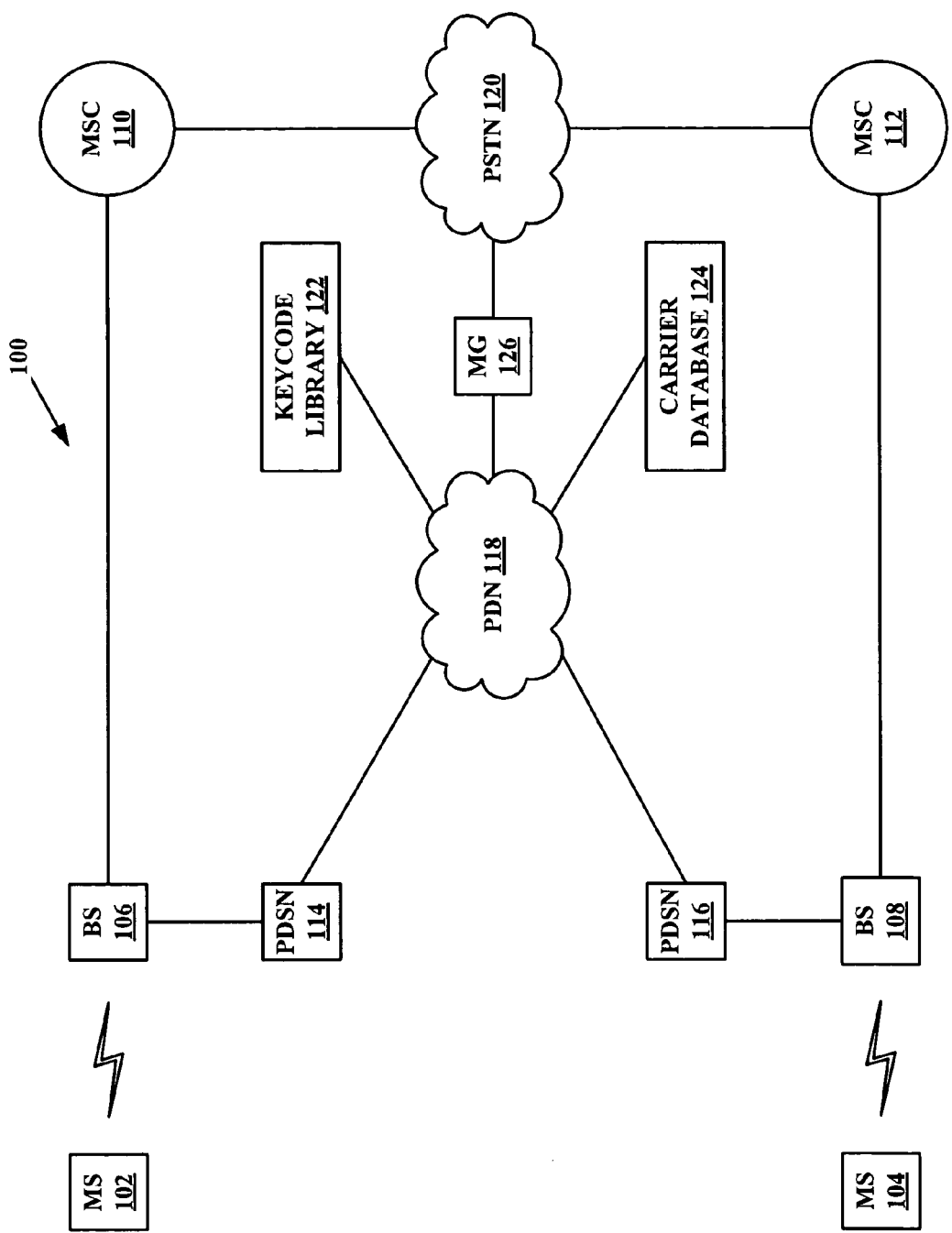
FIG. 1 is a simplified block diagram of a communication system that may be used in accordance with exemplary embodiments.

As presently contemplated, a base station, through the use of operational measurements, determines when an overloaded condition exists (or is about to exist) and dynamically activates one or more additional carriers to handle the increased load. The base station may determine that an overloaded condition exists by determining that one or more measured values related to the level of load in the base station's wireless coverage area exceeds a corresponding threshold. The base station, then, essentially monitors whether the number of mobile stations that the base station is currently serving—and that are attempting to communicate via the base station—warrants activation by the base station of one or more additional carriers.

In response to determining that this is the case, the base station takes steps to activate additional carriers to better handle the high demands currently being placed on that base station. In essence, the base station determines that, because a large number of mobile stations are currently accessing—or attempting to access—the base station, it would be advantageous for the base station to operate on a greater number of carriers.

To facilitate the activation of additional carriers to handle the increased load, the base station obtains a keycode for each additional carrier that the base station has determined should be activated. It should be understood that the base station may obtain any number of keycodes in order to activate additional carriers. While the balance of this overview describes a base station activating one additional carrier, this is merely an example.

To obtain a keycode, the base station may transmit a request to a network entity referred to herein as a keycode library. The keycode library may take the form of a server that receives requests for keycodes from base stations and either grants or denies such requests. If the keycode library grants the base station's request, the keycode library may then transmit a response to the base station, where the response includes the requested keycode. The keycode may be a single digit string, though it may take the form of any collection of data, such as any number of serial numbers, passwords, carrier-licensing data, and/or any other data. In addition to transmitting the requested keycode to the base station, the keycode library also "checks out" the particular keycode to the requesting base station, such that the particular keycode is, for the time being, made unavailable to other base stations in the WWAN.

Receipt by the base station of the keycode from the keycode library enables the base station to activate one additional carrier. It may or may not, however, inform the base station as to which particular carrier to activate. Service providers often build WWANs such that base stations have many different options as to which carriers to use, and service providers typically select different carriers for different geographical areas in an attempt to maximize quality of service in the particular area and minimize interference and service disruption. As such, a service provider may want a first base station in a first metropolitan area to activate a particular, carrier upon receipt of a keycode, while wanting a second base station in a second metropolitan area to activate a different carrier upon receipt of a keycode.

Thus, upon receipt of the requested keycode from the keycode library, the base station may make a second query, this time to a database that identifies a particular carrier for the base station to activate. Again, this database may take the form of a network server to which the base station transmits a request and from which the base station receives a response. In making the request to this carrier database, the base station may provide an identifier of the base station, such as an IP address, serial number, or some other identifier. The carrier database may then look up a list of carriers associated with that base-station identifier, and select a carrier from that list to provide in the response to the base station.

As another possibility, the base station may provide in the request an indication of the base station's location, such as the name of a city, county, section of a city, intersection, Global Positioning System (GPS) coordinates, or any other representation of the base station's location. The carrier database may then use that location information to identify a list of carriers, select a carrier from that list, and transmit a response to the base station identifying the particular carrier to use. Among the information which the carrier database may use to select a particular carrier for the requesting base station may be the carriers currently in use by other base stations in wireless coverage areas that are adjacent to the requesting base station's wireless coverage area.

Upon receipt of the response from the carrier database, identifying a particular carrier, the base station may use the keycode received from the keycode library to activate the identified carrier. As an example, the base station's operational software may issue a command to a hardware or software module in the base station that is responsible for activating carriers. That module may challenge the operational software to provide a keycode; the operational software may then provide the keycode obtained from the keycode library, at which point the base station may respond by approving the request and activating the identified carrier.

The base station may, upon activation of the additional carrier, take steps to update other operational parameters to reflect that activation. In some embodiments, this may involve the base station updating its channel-list message (CLM) to include information regarding the activated carrier. The CLM is a message broadcast by base stations to inform mobile stations in a wireless coverage area of the carriers on which the base station is currently providing service.

Furthermore, some base stations are programmed to maintain and broadcast a neighbor list, which informs mobile stations about other base stations in the nearby area, and about the carriers—and other parameters—on which those neighboring base stations ("neighbors") are currently operating. Mobile stations may make use of this information by connecting to one of those neighbors, perhaps upon moving closer to one of the neighbors, or perhaps simply in an attempt to attain better service. Thus, another process that the base station may undergo following activation of an additional carrier is to update its own "neighbor list" as well as the neighbor lists of the base station's neighbors in the WWAN.

To update its own neighbor list, a base station may either wirelessly detect its neighbors' CLMs, or query the carrier database, or some other database, to make sure that the base station's own neighbor list has current information. As part of this process, the base station may determine whether any neighbors are currently operating carriers using "checked out" keycodes.

To cause an updating of its neighbors' neighbor lists, a base station may take any of a number of actions. For example, a base station may simply—wirelessly or through a packet-data network—transmit a message to its neighbors informing them to update their neighbor lists to reflect activation of the additional carrier by the base station. The base station could instead obtain its neighbors' neighbor lists, update them, and send them back to the neighbors. In still other embodiments, the base station may transmit a message to the neighbors instructing them to update their neighbor lists, due to a change occurring in the neighborhood.

Lastly, the base station may periodically examine the loading measurements that caused the base station to activate the additional carrier, and determine at a certain point that the level of load in the wireless coverage area no longer exceeds the particular threshold. Upon determining that the loading conditions have subsided, the base station may then deactivate the additional carrier, and notify the keycode library that the base station is no longer using the checked-out keycode. The keycode library may acknowledge this, and may also make the keycode available to other base stations in the WWAN. Finally, the base station may take steps to update its CLM and its neighbors' neighbor lists to reflect deactivation of the additional carrier.

2. Exemplary Architecture a. Exemplary Communication System

FIG. 1 is a simplified block diagram of a communication system that may be used in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, the communication system 100 includes mobile stations (MS) 102 and 104, base stations (BS) 106 and 108, mobile switching centers (MSC) 110 and 112, packet data serving nodes (PDSN) 114 and 116, a packet-data network (PDN) 118, a public switched telephone network (PSTN) 120, a keycode library 122, a carrier database 124, and a media gateway 126. It should be understood that any number of network entities not shown in FIG. 1 could be present as well. As examples, there could be any number of mobile stations and other devices in communication with base stations 106 and 108, PDN 118, and PSTN 120. Furthermore, there could be any number of intermediate devices and networks making up all or part of any of the communication links. For example, there could be one or more routers or other devices on the communication link between PDSN 114 and PDN 118.

Mobile stations 102 and 104 may be any mobile devices capable of communicating with one or more base stations, such as base stations 106 and 108, and of carrying out the functions described herein. As an example, mobile station 102 may communicate with base station 106 over a radio-frequency (RF) air interface using a protocol such as CDMA. As examples, one or both of mobile stations 102 and 104 may be a cell phone, PDA, or laptop computer.

Base stations 106 and 108 may be any base stations capable of communicating over an RF air interface with multiple mobile stations, such as mobile stations 102 and 104, using a protocol such as CDMA. One such protocol is cdma2000®, described in "CDMA 2000® Series," TIA/EIA/IS-2000 Series, Rev. A (March 2000), which is incorporated herein by reference. Base station 106 may be communicatively coupled with at least MSC 110 and PDSN 114, while base station 108 may be communicatively coupled with at least MSC 112 and PDSN 116; and each of base stations 106 and 108 may communicate with one or more mobile stations, such as mobile stations 102 and 104. Base station 106 is described more fully in connection with FIG. 2.

MSCs and PDSNs are known in the art, and thus are not described in detail here. MSCs 110 and 112 connect calls between base station 106 and 108, respectively, and PSTN 120. MSCs 110 and 112 are essentially switches that enable mobile stations, such as mobile stations 102 and 104, to place calls to and receive calls from PSTN 120. PDSNs 114 and 116 provide packet-data connectivity between base station 106 and 108, respectively, and PDN 118. PDSNs 114 and 116 are essentially network access servers that enable mobile stations, such as mobile stations 102 and 104, to send packet data to and receive packet data from PDN 118.

PDN 118 may be communicatively coupled with at least PDSN 114, PDSN 116, keycode library 122, carrier database 124, and gateway 126, and may include one or more wide area networks, one or more local area networks, one or more public networks such as the Internet, one or more private networks, and/or one or more wired or wireless networks. Devices in communication with PDN 118 may exchange data using a packet-switched protocol such as the Internet Protocol (IP), and may be identified by an address such as an IP address. PSTN 120 may be the circuit-switched network known as the Public Switched Telephone Network, and may be communicatively coupled with at least MSC 110, MSC 112, and gateway 126.

Keycode library 122 and carrier database 124 may each be a network device such as that described in connection with FIG. 3, arranged to carry out the functions described herein. As such, keycode library 122 and carrier database 124 may each include a processor, data storage, and a communication interface for sending and receiving data over PDN 118. Alternatively, keycode library 122 and carrier database 124 may, in fact, be a single server, or may be functional parts of one or more other network entities.

Media gateway 126 may be a networking device arranged to pass communications between PDN 118 and PSTN 120, and may thus have one interface for communicating with PDN 118 and another for communicating with PSTN 120. Gateway 126 may receive packet-based communications from PDN 118, convert those communications to a circuit-switched format, and transmit those communications to PSTN 120. Gateway 126 may also receive circuit-switched communications from PSTN 120, convert those communications to a packet-based format, and transmit those communications to PDN 118.

b. Exemplary Base Station

Figure 2:
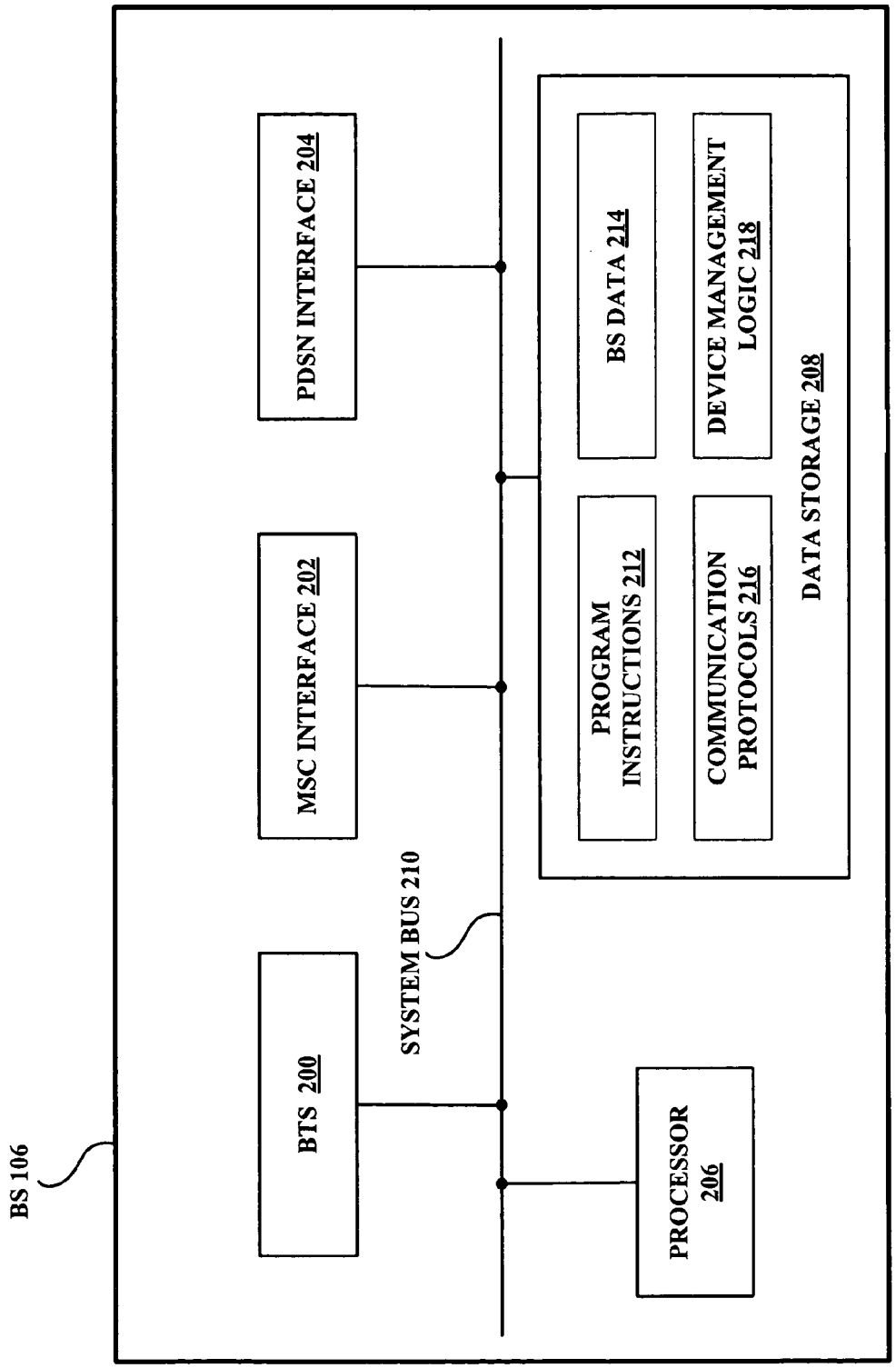
FIG. 2 is a simplified block diagram of an exemplary base station that may be used in accordance with exemplary embodiments.

FIG. 2 is a simplified block diagram of an exemplary base station that may be used in accordance with exemplary embodiments. In particular, FIG. 2 shows that base station 106 of FIG. 1 includes a BTS 200, an MSC interface 202, a PDSN interface 204, a processor 206, and data storage 208, all of which may be communicatively linked by a system bus 210. In general, base station 106 may be any device arranged to communicate with (i) one or more mobile stations via an RF air interface and (ii) entities such as an MSC and a PDSN, and to carry out the base-station functions described herein.

BTS 200 may comprise a tower with antennas that radiate to define a wireless coverage area, within which mobile devices may communicate with BTS 200 over an RF air interface. Base station 106 may use BTS 200 to communicate with wireless devices over that interface according to an air interface protocol. Examples of such protocols include CDMA, Advanced Mobile Phone Service (AMPS), Time Division Multiple Access (TDMA), and Global System for Mobile communication (GSM). For example, the protocol could comply with the standards IS-95 and cdma2000®, which are incorporated by reference. It should be understood that BTS 200 may take the form of more than one BTS, and that one BTS is depicted by way of illustration.

MSC interface 202 may be used by base station 106 to communicate with an MSC, such as MSC 110, and may take the form of an interface capable of circuit-switched and/or packet-switched communication. MSC interface 202 may be capable of communicating with MSC 110 in a wired and/or wireless manner. As such, MSC interface 202 may include an Ethernet card, and may also or instead include a chipset and antenna to facilitate wireless communication.

PDSN interface 204 may be used by base station 106 to communicate with a PDSN, such, as PDSN 114, and may take the form of an interface capable of packet-switched communication. PDSN interface 204 may be capable of communicating with PDSN 114 in a wired and/or wireless manner. As such, PDSN interface 204 may include an Ethernet card, and may also or instead include a chipset and antenna to facilitate wireless communication. MSC interface 202 and PDSN interface 204 may be integrally formed, or may in fact be a single interface.

Processor 206 may comprise multiple (e.g., parallel) processors, such as a general purpose microprocessor and/or a discrete digital signal processor. Data storage 208 may take various forms, in one or more parts, such as a non-volatile storage block and/or a removable storage medium. Data storage 208 may store program instructions 212, base-station (BS) data 214, communication protocols 216, and device management logic 218. Program instructions 212 may be executable by processor 206 to carry out various functions described herein. BS data 214 may include identification of one or more carriers, one or more keycodes to enable base station 106 to operate on the one or more carriers, data reflecting measurements of load in the wireless coverage area of BTS 200, and/or any other types of data.

Communication protocols 216 may be useful to receive data from and send data to one or more mobile stations, MSC 110, PDSN 114, and one or more other entities, and may include any of the protocols mentioned herein, one or more proprietary protocols, and/or one or more other protocols now known or later developed. Compatible protocols may be stored in other entities in communication with base station 106. Device management logic 218 may be used to manage aspects of base station 106 such as memory and file management.

c. Exemplary Network Device
i. General Structure

Figure 3:
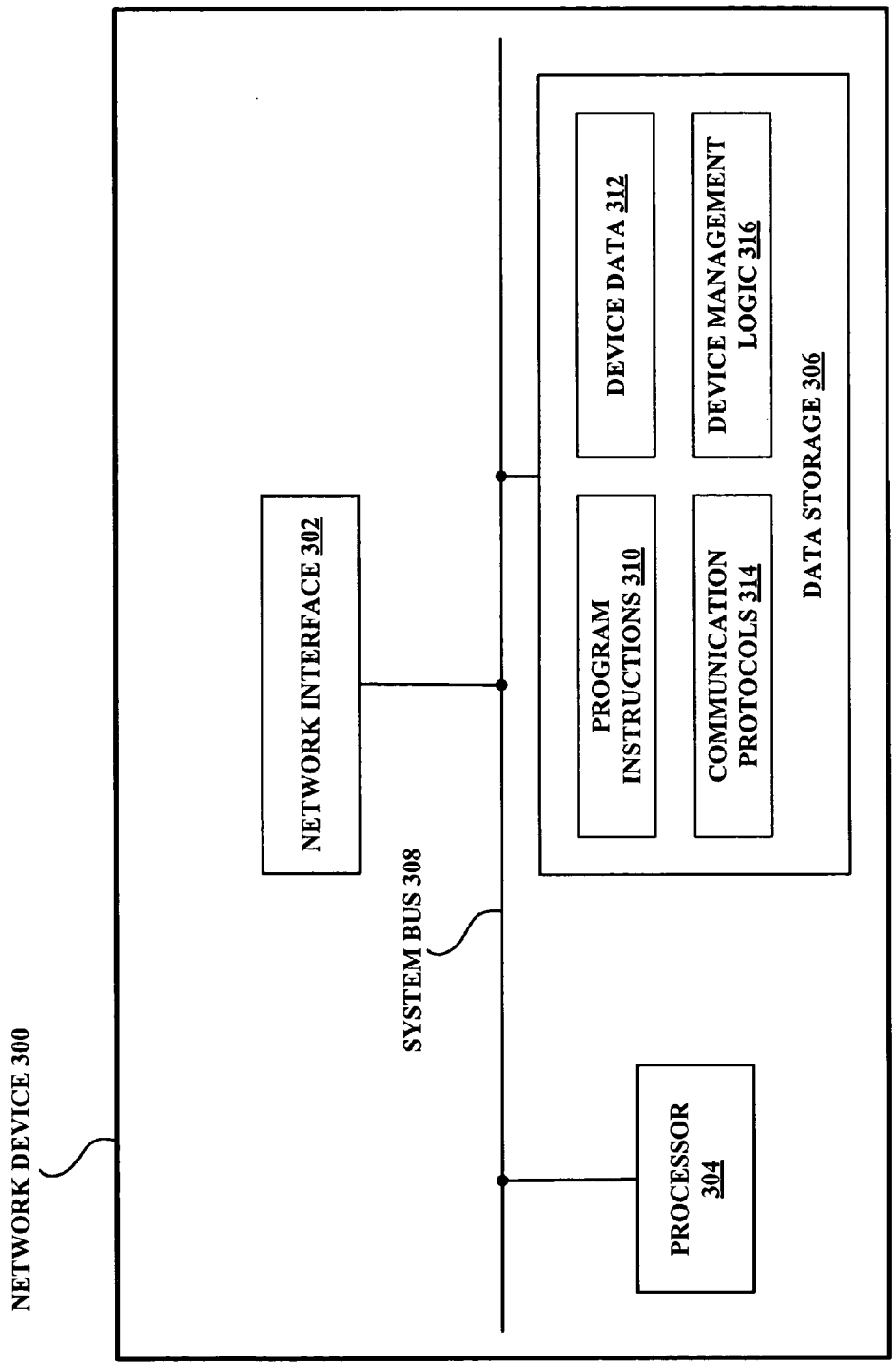
FIG. 3 is a simplified block diagram of an exemplary network device that may be used in accordance with exemplary embodiments.

FIG. 3 is a simplified block diagram of an exemplary network device that may be used in accordance with exemplary embodiments. In particular, keycode library 122 and carrier database 124 may have a structure similar to that of network device 300 of FIG. 3, which includes a network interface 302, a processor 304, and data storage 306, all of which may be communicatively linked by a system bus 308. In general, network device 300 may be any device arranged to communicate over one or more networks, and to carry out the functions described herein with respect to keycode library 122 and/or carrier database 124.

Network interface 302 may be a combination of hardware and software enabling network device 300 to communicate with base station 106, and possibly one or more additional entities, and may, for example, include an Ethernet card. Network interface 302 may, instead or in addition, include a wireless-communication interface, which may enable it to communicate wirelessly with one or more devices such as base station 106.

Processor 304 may comprise multiple (e.g., parallel) processors, such as a general purpose microprocessor and/or a discrete digital signal processor. Data storage 306 may take various forms, in one or more parts, such as a non-volatile storage block and/or a removable storage medium. Data storage 306 may store program instructions 310, device data 312, communication protocols 314, and device management logic 316. Program instructions 310 may be executable by processor 304 to carry out various functions described herein. Device data 312 may include any type of data related to the functions described herein, some possibilities being described below in connection with FIGS. 4, 5, and 6.

Communication protocols 314 may be useful to receive data from and send data to one or more network entities, and may include any of the protocols mentioned herein, one or more proprietary protocols, and/or one or more other protocols now known or later developed. Compatible protocols may also be stored in other entities in communication with network device 300. Device management logic 316 may be used to manage aspects of network device 300 such as memory and file management.

ii. Exemplary Keycode Table

FIG. 4 is a simplified block diagram of an exemplary keycode table that may be used in accordance with exemplary embodiments. In particular, FIG. 4 depicts a keycode table 400 that may be stored as device data 312, in the case of FIG. 3 representing keycode library 122. Keycode table 400 is shown in FIG. 4 as having five rows 402-410, each of which contains a particular keycode in one column and an indication in the other column as to whether that particular keycode is currently available or checked out to a base station.

The fact that keycode table 400 contains five rows means that, in this example, keycode library 122 maintains a pool of five keycodes that are available to base stations: KEYCODE_1 through KEYCODE_5. It should be understood, however, that keycode table 400 could contain more or less than five keycodes. Each keycode could take the form of a single string of characters, a single string of digits, an alphanumeric string, multiple data fields, or any other form. In this example, rows 402-410 indicate that KEYCODE_1 is currently checked out to base station 106, KEYCODE_4 is currently checked out to base station 108, and KEYCODE_2, KEYCODE_3, and KEYCODE_5 are available to be checked out.

iii. Exemplary Carrier Tables

Figure 5:
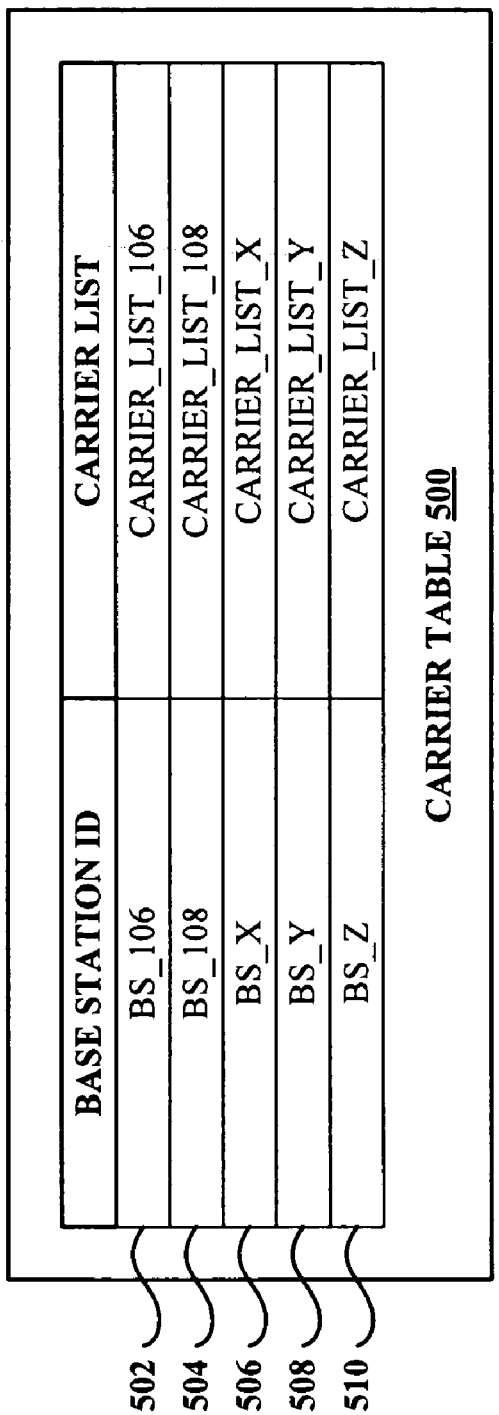
FIG. 5 is a simplified block diagram of a first exemplary carrier table that may be used in accordance with exemplary embodiments.

FIG. 5 is a simplified block diagram of a first exemplary carrier table that may be used in accordance with exemplary embodiments. In particular, FIG. 5 depicts a carrier table 500 that may be stored as device data 312, in the case of FIG. 3 representing carrier database 124. Carrier table 500 is shown in FIG. 5 as having five rows 502-510, each of which contains a base-station identifier in one column and an associated list of carriers in the other column.

The fact that carrier table 500 contains five rows means that, in this example, carrier database 124 maintains five carrier lists corresponding respectively to five base stations: CARRIER_LIST_106 for base station 106 (BS_106), and so on. It should be understood, however, that carrier table 500 could contain carrier lists corresponding to more or less than five base stations. Furthermore, two or more of the carrier lists stored in carrier table 500 could be identical, or one or more base stations could be associated with the same carrier list.

The base-station identifiers stored in the first column of rows 502-510 may take various forms. For example, these identifiers could be serial numbers, network addresses, names, or any other identifier that identifies a particular base station. Additionally, each carrier list may include one or more carriers on which an associated base station may operate. These carriers may be listed in terms of a single radio frequency, which may for example be a center frequency in an RF band associated with the carrier. Each carrier may also in fact comprise a pair of frequencies, such as a first frequency on which a base station may transmit to mobile stations, and a second frequency on which mobile stations may transmit to a base station.

Figure 6:
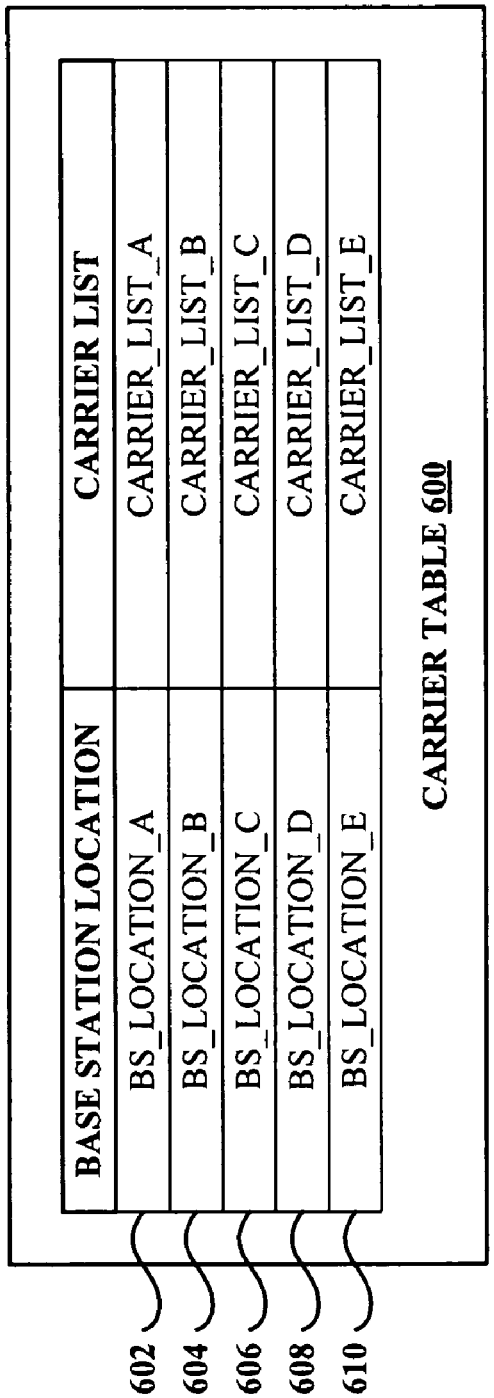
FIG. 6 is a simplified block diagram of a second exemplary carrier table that may be used in accordance with exemplary embodiments.

FIG. 6 is a simplified block diagram of a second exemplary carrier table that may be used in accordance with exemplary embodiments. In particular, FIG. 6 depicts a carrier table 600 that may be stored as device data 312 by carrier database 124 as an alternative to using a table such as carrier table 500 of FIG. 5. Carrier table 600 is identical to carrier table 500, except for the fact that base-station locations, rather than base-station identifiers, are mapped to lists of carriers. These base-station locations (BS_LOCATION_A through BS_LOCATION_E) may be stored in terms of GPS coordinates, a city, a section of a city, a county, a street address, an intersection, a zip code, or in any other manner that conveys a location of a base station.

3. Exemplary Operation a. Exemplary Base-Station Operation

Figure 7:
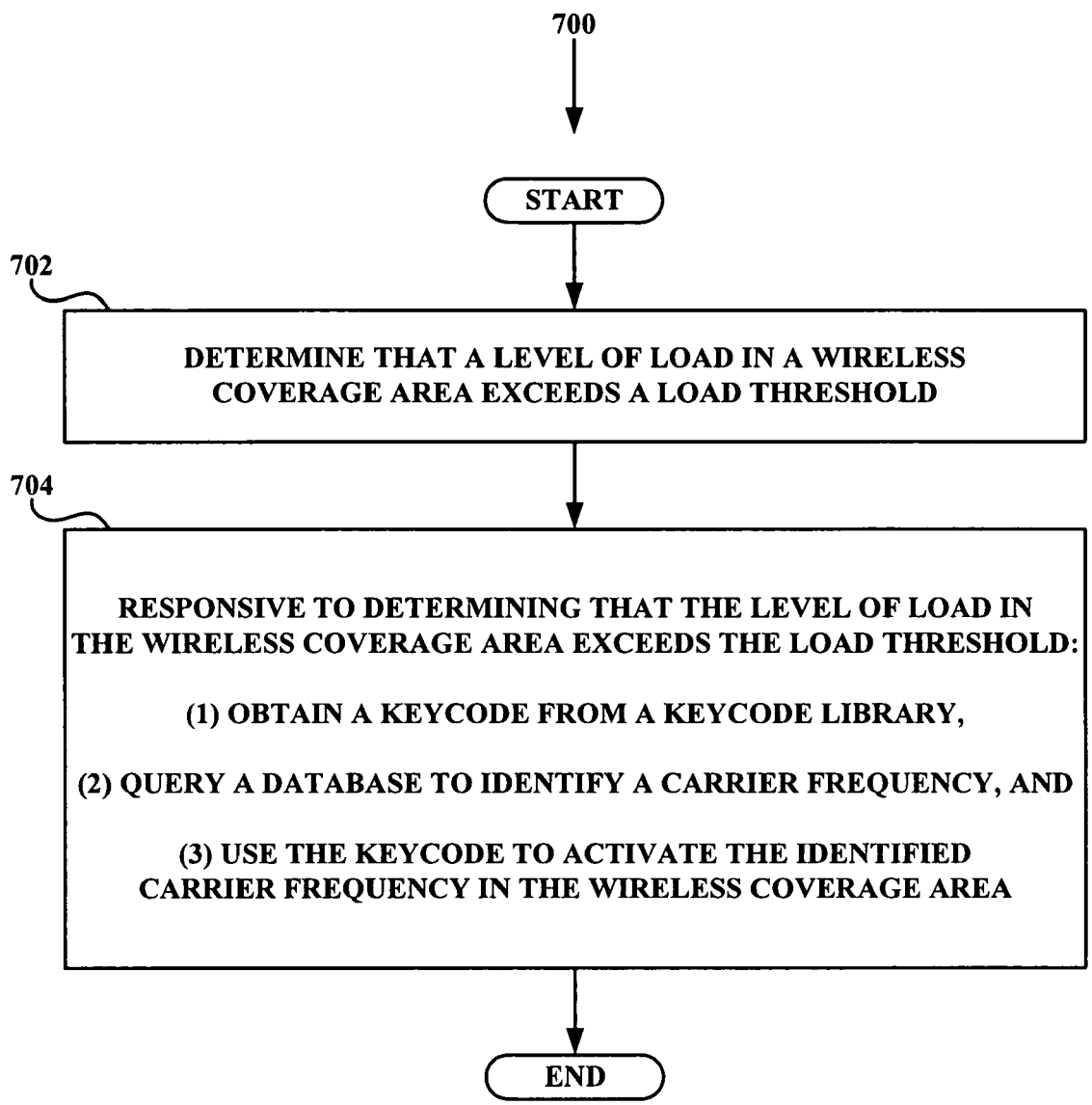
FIG. 7 is a flowchart of a first method that makes use of the communication system of FIG. 1, in accordance with an exemplary embodiment.

FIG. 7 is a flowchart of a first method that makes use of the communication system of FIG. 1, in accordance with an exemplary embodiment. As shown in FIG. 7, the method 700 begins at step 702, when base station 106 determines that a level of load in its wireless coverage area exceeds a load threshold. At step 704, responsive to determining that the level of load exceeds the load threshold, base station 106 (i) obtains a particular keycode from keycode library 122, which then makes the particular keycode unavailable to other base stations such as base station 108, (ii) identifies a particular carrier, and (iii) uses the keycode to activate the carrier in the wireless coverage area. These steps are further explained by the following subsections.

i. Determining the Level of Load in the Wireless Coverage Area

At step 702, base station 106 determines that a level of load in base station 106's wireless coverage area exceeds a load threshold. Base station 106 may carry out step 702 by monitoring measured values of various load-related parameters, and determining that at least one of those measured values exceeds a threshold value corresponding to the measured value. As examples, base station 106 may monitor paging-channel occupancy, access-channel occupancy, traffic-channel occupancy, and/or radio-frequency (RF) power consumption, each of which are explained below. Base station 106 may thus carry out step 702 by comparing measurements of one or more of these values, and/or other values, against thresholds that have been programmed into base station 106 for each measured value.

Paging-channel occupancy refers to the fraction, percentage, or raw number of available paging-channel timeslots that are currently in use by mobile stations. Each base station is typically able to broadcast to mobile stations over more than one channel. Furthermore, base stations typically reserve one or more of those channels to be used as paging channels, which the base station may then use to send messages to mobile stations to alert the mobile stations of incoming calls, incoming text messages, or for other purposes.

In order for a base station to be able to use a paging channel to send alerts to multiple mobile stations, the base station will typically divide a paging channel into multiple timeslots, where each timeslot is capable of carrying one or more messages to one or more mobile stations. Therefore, the greater the number of these timeslots that are currently in use for sending messages to mobile stations, the heavier the load is that the base station is experiencing.

Access-channel occupancy is a measure of load that is analogous to paging-channel occupancy, but pertains to channels known as access channels rather than to paging channels. Access channels are the one or more channels that a base station may reserve for receiving messages from mobile stations. These messages may correspond to requests for call initiation, or to other administrative functions. In any event, it may also be the case that the greater the number of access-channel timeslots that are currently in use for receiving messages from mobile stations, the heavier the load is that the base station is experiencing.

Traffic-channel occupancy is a measure of the number of mobile stations in a base station's wireless coverage area that are currently engaged in communication sessions. In addition to administrative channels such as paging channels and access channels, base stations typically reserve most of their available channels on a particular carrier for use as traffic channels, each capable of bearing a mobile station's communication session.

Each time a mobile station successfully initiates or receives a call, a base station assigns to the mobile station a particular traffic channel on which to conduct that communication session. In certain CDMA systems, the base station does so by assigning one of its limited number of codes, known as Walsh codes, to the mobile station. Note that administrative channels use Walsh codes as well, but in those cases the Walsh codes are more or less permanently assigned. Therefore, the greater the number of the Walsh codes—of the Walsh codes that a base station reserves for traffic channels—that are currently assigned to mobile stations, the heavier the load is that the base station is experiencing.

RF-power consumption may also be used as an indicator of the amount of load a base station is currently experiencing. Each base station may contain a device, sometimes known as a high power amplifier (HPA), responsible for outputting sufficient power for the base station to operate. Often, a certain percentage (e.g., 20%) of this power is reserved for administrative functions such as paging. The remainder (e.g., 80%) of this power is reserved for mobile stations' communication sessions, and is allocated to the various mobile stations in communication with the base station based on a number of criteria, which may include, as an example, the distance between the base station and a mobile station. Thus, a base station may monitor how much of that power is currently being required: the higher the current power requirements, the heavier the load is that the base station is experiencing.

ii. Obtaining a Keycode, Identifying a Carrier, and Using the Obtained Keycode to Activate the Identified Carrier At step 704, responsive to making the determination of step 702, base station 106 (i) obtains a particular keycode from keycode library 122, which then makes the particular keycode unavailable to other base stations such as base station 108, (ii) identifies a particular carrier, and (iii) uses the keycode to activate the carrier in the wireless coverage area.

Base station 106 may obtain the keycode from the keycode library 122 by transmitting a request via PDSN 114 and PDN 118 to keycode library 122. Keycode library 122 may respond by transmitting a response back via PDN 118 and PDSN 114 to base station 106, providing a particular keycode such as KEYCODE_1 of FIG. 4. Keycode library 122 may also store an indication associated with KEYCODE_1, indicating that the keycode is checked out to a base station. This indication may or may not specify the base station. For example, the indication could be an identifier (such as a serial number or name) of base station 106. In other embodiments, the indication may be analogous to a checkmark, which indicates that the keycode is checked out, but does not indicate to which base station.

Base station 106 may then, or at substantially the same time, query carrier database 124 to identify a particular carrier to activate. Base station 106 may do this by transmitting a request via PDSN 114 and PDN 118 to carrier database 124. This request may include an identifier for base station 106 and/or an indication of the location of base station 106. Carrier database 124 may then use the provided identifier and/or location to identify a list of carriers.

Carrier database 124 may then select one of those carriers according to some stored logic, perhaps using a random-selection or interference-avoidance technique, and then provide the identity of the selected carrier in a response to base station 106 via PDN 118 and PDSN 114. It should be understood that carrier database 124 need not have a stored base-station identifier or location that matches the provided data exactly; the database could store ranges of identifiers and/or locations, and find a range that contains the provided data.

Upon receipt of both the keycode and the identification of the carrier, base station 106 uses the keycode to activate the carrier in its wireless coverage area. This may take the form of the base station's operational software providing the keycode to a module that governs the base station's ability to activate carriers. The act of providing the keycode may occur as part of a request or in response to a challenge. Once the carrier is activated, base station 106 may then provide service to one or more mobile stations on the activated carrier.

Once the additional carrier has been activated, base station 106 may take certain steps to update certain messages and parameters maintained by base station 106 to reflect activation of the additional carrier in the wireless coverage area. One of these messages that base station 106 may update is known as a channel-list message (CLM), which is a message that base stations often broadcast over a paging channel to mobile stations, and typically includes a list of one or more carriers on which the base station is currently providing service. Thus, upon activation of the additional carrier, base station 106 may update its CLM to reflect this.

Base stations also typically maintain a list known as a neighbor list, which includes a list of neighboring base stations ("neighbors") and the particular carriers on which those neighbors are currently operating. Following activation of the additional carrier, base station 106 may take steps to check that its neighbor list and its neighbors' neighbor lists are updated.

With respect to updating its own neighbor list, base station 106 may query the carrier database or another database to determine on which carriers its neighbors are operating, and whether those neighbors are using keycodes obtained from keycode library 122 to operate one or more carriers. Base station 106 may, perhaps as a result of such a database query, determine that one or more of its neighbors are currently operating on carriers using one or more keycodes checked out from keycode library 122. Base station 106 may then update its own neighbor list to reflect this, as well as to reflect the complete set of carriers on which its neighbors are currently operating. Base station 106 may also determine the carriers on which its neighbors are currently operating by receiving its neighbors CLMs or other messages, which may or may not indicate whether the neighbors are using checked-out keycodes to facilitate carrier operation.

Base station 106 may cause its neighbors to update their neighbor lists in a number of ways. One way would be for base station 106 to transmit a message to each of its neighbors, alerting them that base station 106 has activated a particular carrier. The neighbors may then update their neighbor lists accordingly. Another way would be for base station 106 to receive one or more neighbor lists, update them, and transmit them back to the correct neighbors. Yet another way would be for base station 106 to transmit a message to its neighbors advising them that a change has been made in base station 106's configuration, and instructing them to undergo a process of updating their own neighbor list. Other examples may be possible as well.

Base station 106 may configure certain parameters for the activated carrier based on the information in its neighbor's neighbor lists as well. In cases where no neighbors are present, however, base station 106 may have a set of default values, sometimes known as "hard-handoff parameters," which the base station may use to configure the carrier for operation.

It should be understood that certain components of base station 106 may carry out certain of the functions described herein. For example, BTS 200 may carry out step 702 while the remaining components of base station 106, which may be embodied in a network device known as a base station controller (BSC), may carry out step 704.

Finally, base station 106 may determine that the load no longer exceeds the particular threshold, and responsively deactivate the identified carrier and notify keycode library 122 that base station 106 is no longer using the obtained keycode, such that keycode library 122 may then make that keycode available to base stations in the WWAN. Base station 106 may then take steps to update its CLM and neighbors' neighbor lists accordingly.

b. Exemplary Keycode-Library Operation

Figure 8:
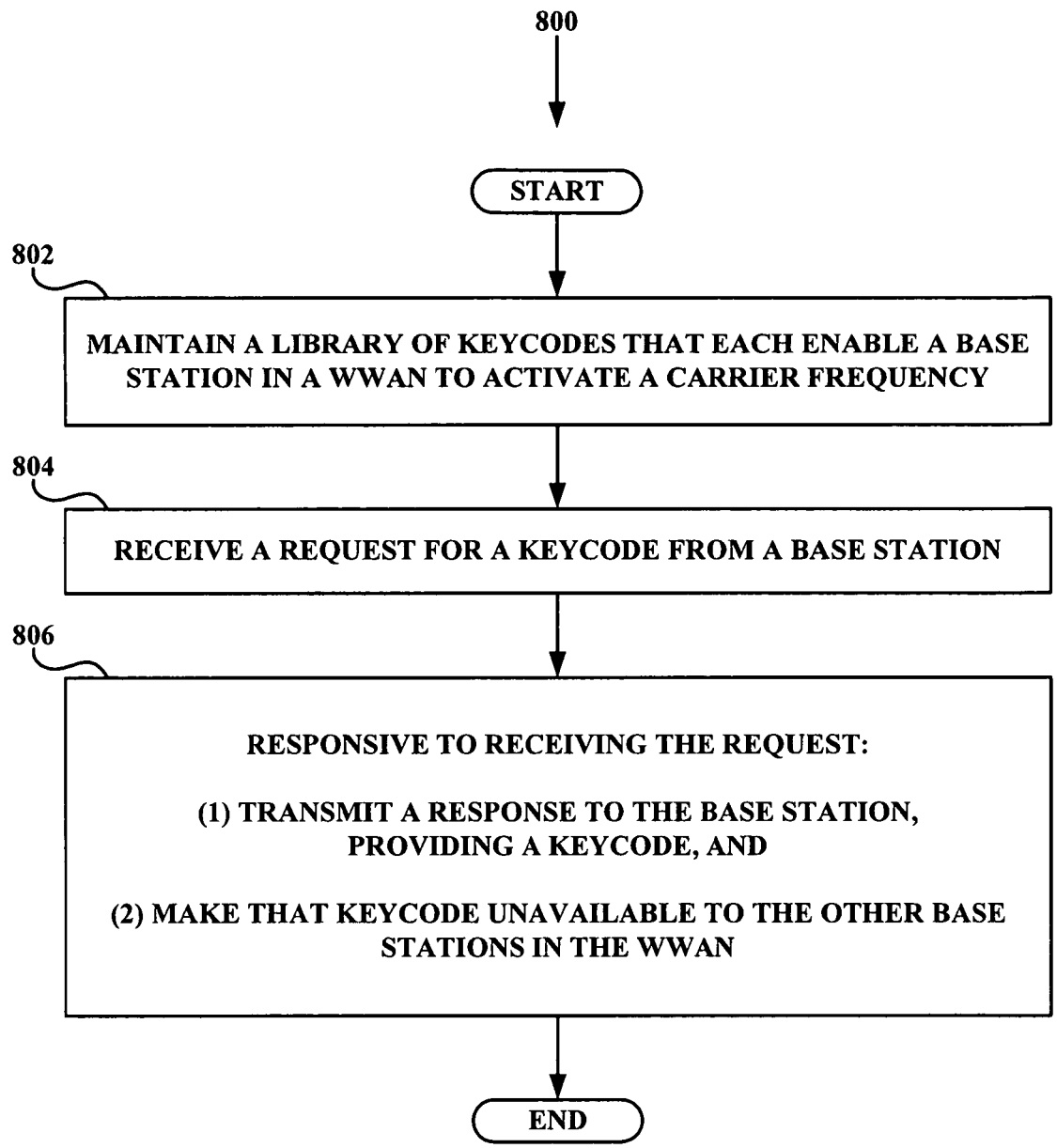
FIG. 8 is a flowchart of a second method that makes use of the communication system of FIG. 1, in accordance with an exemplary embodiment.

FIG. 8 is a flowchart of a second method that makes use of the communication system of FIG. 1, in accordance with an exemplary embodiment. In particular, FIG. 8 depicts a method 800 that may be carried out by keycode library 122. At step 802, keycode library 122 maintains a library of keycodes, perhaps including a keycode table such as keycode table 400 of FIG. 4. At step 804, keycode library 122 receives a request for a keycode from base station 106, in the manner described above. At step 806, responsive to receiving the request at step 804, keycode library 122 (i) transmits a response to base station 106, providing a particular keycode, and (ii) makes that keycode unavailable to any other base stations.

As described above, keycode library 122 may make the particular keycode unavailable to other base stations in the WWAN by storing an indicator corresponding to the particular keycode. In some embodiments, this indicator is an identifier of base station 106. At a certain point, keycode library 122 may receive notification from base station 106 that the base station is no longer using the particular keycode. Responsive to that notification, keycode library 122 may then make the particular keycode available to base stations on a network-wide basis.

4. Conclusion

Various exemplary embodiments have been described above. Those skilled in the art will understand, however, that changes and modifications may be made to those examples without departing from the scope of the claims.

What is claimed is:

1. A method comprising:
a first base station among a plurality of base stations in a wireless wide area network (WWAN) determining that a level of load in a wireless coverage area exceeds a load threshold; and
responsive to determining that the level of load exceeds the load threshold, the first base station (i) obtaining a first keycode from a keycode library, wherein the first keycode then becomes unavailable to the other base stations of the plurality of base stations, (ii) identifying a carrier frequency, and (iii) using the first keycode to activate the identified carrier frequency in the wireless coverage area; wherein the first keycode corresponds to a license for a given base station to activate an additional frequency; the first base station determining whether a neighboring base station in the plurality of base stations is currently using a second keycode from the keycode library to provide service on a particular carrier frequency; and responsive to determining that the neighboring base station is currently using a second keycode from the keycode library to provide service on the particular carrier frequency, the first base station updating a neighbor-list message for the first base station to reflect the neighboring base station providing service on the particular carrier frequency.

2. The method of claim 1, wherein determining that the level of load exceeds the load threshold comprises determining that at least one measured value exceeds a corresponding threshold value.

3. The method of claim 2, wherein the at least one measured value comprises at least one value selected from the group consisting of paging-channel occupancy, access-channel occupancy, traffic-channel occupancy, and radio-frequency (RF) power consumption.

4. The method of claim 1, wherein identifying the carrier frequency comprises transmitting a request to a database and receiving a response from the database, wherein the request comprises at least one of an identifier for the first base station and a location of the first base station.

5. The method of claim 1, further comprising the first base station providing service to at least one mobile station on the activated carrier frequency.

6. The method of claim 1, further comprising the first base station updating a channel-list message for the first base station to reflect operation on the identified carrier frequency in the wireless coverage area.

7. The method of claim 1, further comprising the first base station causing a neighboring base station in the plurality of base stations in the WWAN to update a neighbor-list message for the neighboring base station to reflect operation on the identified carrier frequency by the first base station in the wireless coverage area.

8. The method of claim 7, wherein causing the neighboring base station to update the neighbor-list message for the neighboring base station comprises transmitting to the neighboring base station an updated neighbor-list message for the neighboring base station.

9. The method of claim 7, wherein causing the neighboring base station to update a neighbor-list message for the neighboring base station comprises transmitting to the neighboring base station a message instructing the neighboring base station to update the neighbor-list message for the neighboring base station.

10. The method of claim 1, wherein the first base station comprises a base transceiver station (BTS) and a base station controller (BSC), and wherein determining that the level of load exceeds the load threshold comprises the BTS determining that the level of load exceeds the load threshold, obtaining the first keycode from the keycode library comprises the BSC obtaining the first keycode from the keycode library, identifying the carrier frequency comprises the BSC identifying the carrier frequency, and using the first keycode to activate the identified carrier frequency comprises the BSC using the first keycode to activate the identified carrier frequency.

11. The method of claim 1, further comprising:
the first base station determining that the level of load in the wireless coverage area no longer exceeds the load threshold; and
responsive to determining that the level of load no longer exceeds the load threshold, the first base station (i) deactivating the identified carrier frequency in the wireless coverage area and (ii) notifying the keycode library that the first base station is no longer using the first keycode, such that the keycode library then makes the first keycode available to the plurality of base stations.

12. A base station among a plurality of base stations in a wireless wide area network (WWAN), the base station comprising:
a base transceiver station (BTS), wherein the BTS provides a wireless coverage area;
a mobile switching center (MSC) interface;
a packet data serving node (PDSN) interface;
a processor; and
data storage having stored therein instructions executable by the processor to:
determine that a level of load in the wireless coverage area exceeds a load threshold; and
responsive to determining that the level of load exceeds the load threshold, (i) obtain a first keycode from a keycode library, wherein the first keycode then becomes unavailable to the other base stations of the plurality of base stations, (ii) identify a carrier frequency, and (iii) use the first keycode to activate the identified carrier frequency in the wireless coverage area; wherein the first keycode corresponds to a license for a given base station to activate an additional frequency; the base station determining whether a neighboring base station in the plurality of base stations is currently using a second keycode from the keycode library to provide service on a particular carrier frequency; and responsive to determining that the neighboring base station is currently using a second keycode from the keycode library to provide service on the particular carrier frequency, the first base station updating a neighbor-list message for the first base station to reflect the neighboring base station providing service on the particular carrier frequency.

13. The base station of claim 12, wherein the instructions to determine that the level of load exceeds the load threshold comprise instructions to determine that at least one measured value exceeds a corresponding threshold value.

14. The base station of claim 12, wherein the at least one measured value comprises at least one value selected from the group consisting of paging-channel occupancy, access-channel occupancy, traffic-channel occupancy, and radio-frequency (RF) power consumption.

15. A method comprising:
maintaining a keycode library comprising a plurality of keycodes, wherein each keycode of the plurality of keycodes comprises data for a given base station among a plurality of base stations in a wireless wide area network (WWAN) to use in activating a carrier frequency in a given wireless coverage area;
the keycode library receiving a request for a keycode from a first base station in the plurality of base stations; and
responsive to receiving the request, the keycode library (i) transmitting a response to the first base station, wherein the response provides a first keycode from the plurality of keycodes, and (ii) making the first keycode unavailable to other base stations of the plurality of base stations; wherein each keycode corresponds to a license for a given base station to activate an additional frequency; the first base station determining whether a neighboring base station in the plurality of base stations is currently using a second keycode from the keycode library to provide service on a particular carrier frequency; and responsive to determining that the neighboring base station is currently using a second keycode from the keycode library to provide service on the particular carrier frequency, the first base station updating a neighbor-list message for the first base station to reflect the neighboring base station providing service on the particular carrier frequency.

16. The method of claim 15, wherein making the first keycode unavailable to other base stations of the plurality of base stations comprises storing an indicator corresponding to the first keycode, wherein the indicator indicates that the first keycode is in use.

17. The method of claim 16, wherein the indicator comprises an identifier of the first base station.

18. The method of claim 15, further comprising:
the keycode library receiving notification from the first base station that the first base station is no longer using the first keycode; and
responsive to receiving the notification, the keycode library making the first keycode available to the plurality of base stations.

* * * * *